(12) United States Patent
Nagumo

(10) Patent No.: US 8,061,844 B2
(45) Date of Patent: Nov. 22, 2011

(54) OPTICAL DEVICE AND PROJECTOR

(75) Inventor: Toshihiko Nagumo, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 233 days.

(21) Appl. No.: 12/482,728

(22) Filed: Jun. 11, 2009

(65) Prior Publication Data

US 2009/0323025 A1    Dec. 31, 2009

(30) Foreign Application Priority Data

Jun. 26, 2008 (JP) ................ 2008-166934

(51) Int. Cl.
*G03B 21/14* (2006.01)

(52) U.S. Cl. .......................................... 353/20

(58) Field of Classification Search ............ 353/20, 353/31, 33, 81, 97, 101, 122, 99, 119; 349/5, 349/8, 106, 113, 138; 359/359, 634
See application file for complete search history.

(56) References Cited

U.S. PATENT DOCUMENTS

| | | | |
|---|---|---|---|
| 7,502,078 B2 | 3/2009 | Suzuki | |
| 2002/0030792 A1* | 3/2002 | Takizawa et al. | ............. 353/31 |
| 2009/0141243 A1 | 6/2009 | Suzuki | |

FOREIGN PATENT DOCUMENTS

| JP | 10-239783 A | 9/1998 |
|---|---|---|
| JP | 10-319853 A | 12/1998 |
| JP | 2000-310823 A | 11/2000 |
| JP | 2003-270717 A | 9/2003 |
| JP | 2006-003826 A | 1/2006 |
| JP | 2006-209061 A | 8/2006 |
| JP | 2007-108735 A | 4/2007 |
| JP | 2007-183396 A | 7/2007 |

* cited by examiner

*Primary Examiner* — Kevin Pyo
*Assistant Examiner* — Don Williams
(74) *Attorney, Agent, or Firm* — AdvantEdge Law Group, LLC

(57) ABSTRACT

An optical device includes: a plurality of reflection type light modulation devices; a plurality of reflection type polarization plates; a plurality of attachment members; a color combining device; a plurality of adjustment members; engaging projections provided on either the attachment members or the adjustment members and projecting toward the others of the attachment members and the adjustment members; and engaging receivers provided on the others of the attachment members and the adjustment members such that the engaging projections are inserted into the engaging receivers with clearances between the engaging receivers and the engaging projections.

7 Claims, 5 Drawing Sheets

OPTICAL DEVICE AND PROJECTOR

CROSS REFERENCE TO RELATED APPLICATIONS

The present application claims priority from Japanese Patent Application No. 2008-166934 filed on Jun. 26, 2008, which is hereby incorporated by reference in its entirety.

BACKGROUND

1. Technical Field

The present invention relates to an optical device and a projector.

2. Related Art

A projector which includes an optical device for modulating each of R, G, and B lights according to image information and combining the respective modulated color lights into image light, and a projection lens for expanding and projecting the image light thus formed is known (for example, see JP-A-2007-183396).

According to a projector disclosed in JP-A-2007-183396, an optical device includes three liquid crystal panels as reflection type optical modulation devices provided for each color light, three attachment members (support members) each of which has a triangle pole shape and a predetermined surface to which the corresponding liquid crystal panel is attached, and a cross dichroic prism which has a cube shape and combines the respective color lights modulated by the liquid crystal panels into image light. The three attachment members to which the liquid crystal panels are attached and the projection lens are disposed in the vicinity of the four side surfaces of the cube-shaped cross dichroic prism, respectively.

According to this type of projector, the respective liquid crystal panels are required to be disposed at the back focus position of the projection lens for producing clearer images. Moreover, pixel shifts between the liquid crystal panels need to be prevented for obtaining further clearer images. Thus, it is necessary to accurately perform focus adjustment for locating the liquid crystal panels precisely at the back focus position of the projection lens and alignment adjustment for aligning pixels of the respective liquid crystal panels at the time of manufacture of the optical device.

According to the projector disclosed in JP-A-2007-183396, the liquid crystal panels are attached to the attachment members via panel support plates, and thus structures for adjusting positions of the liquid crystal panels are provided between the attachment members and the panel support plates. More specifically, the positions of the liquid crystal panels are adjusted by shifting the liquid crystal panels relative to the attachment members fixed to the cross dichroic prism by using a jig.

In case of a projector which includes highly accurate reflection type liquid crystal panels, deterioration of projection images such as pixel shifts on and blurring of projection images is produced when only slight position shift of the liquid crystal panels is caused. Thus, it is preferable that the positions of the highly accurate reflection type liquid crystal panels are adjusted by using the projection lens practically used while the projection lens and the cross dichroic prism are combined by a head body having a lens support unit for supporting the projection lens and a pedestal on which the cross dichroic prism is mounted.

According to the projector disclosed in JP-A-2007-183396, for adjusting the positions of the liquid crystal panels by combining the projection lens and the cross dichroic prism by the head body, the lens support unit of the head body is disposed on the back side of the liquid crystal panels positioned in the vicinity of the projection lens. Thus, for the position adjustment of the liquid crystal panels, the jig needs to be inserted into a clearance between the lens support unit of the head body and the liquid crystal panels. In this case, the position adjustment of the liquid crystal panels becomes difficult.

SUMMARY

It is an advantage of some aspects of the invention to provide an optical device and a projector capable of easily adjusting positions of reflection type light modulation devices.

An optical device according to a first aspect of the invention includes: a plurality of reflection type light modulation devices which modulate received lights as entrance lights according to image information and release the modulated lights as emission lights; a plurality of reflection type polarization plates which separate the entrance lights entering the reflection type light modulation devices from the emission lights modulated by the reflection type light modulation devices according to polarization; a plurality of attachment members which support the reflection type light modulation devices and the reflection type polarization plates; a color combining device which has a plurality of light entrance surfaces through which lights separated by the plural reflection type polarization plates according to polarization enter and a light exit surface, combines the received respective lights into image light, and releases the image light through the light exit surface; a plurality of adjustment members which support the plural attachment members and are fixed to the light entrance surfaces; engaging projections provided on either the attachment members or the adjustment members and projecting toward the others of the attachment members and the adjustment members; and engaging receivers provided on the others of the attachment members and the adjustment members such that the engaging projections are inserted into the engaging receivers with clearances between the engaging receivers and the engaging projections.

According to the first aspect of the invention, the engaging projections are provided on either the attachment members or the adjustment members and projecting toward the others of the attachment members and the adjustment members, and engaging receivers are provided on the others of the attachment members and the adjustment members such that the engaging projections are inserted into the engaging receivers with clearances between the engaging receivers and the engaging projections. In this case, the positions of the reflection type light modulation devices are adjusted by moving the attachment members which support the reflection type light modulation devices and the reflection type polarization plates. According to this structure, a jig for moving the attachment members is installed on the sufficiently wide area around the attachment members and the color combining device to make position adjustment of the reflection type light modulation devices. Thus, the positions of the reflection type light modulation devices can be more easily adjusted compared with a related-art structure which requires insertion of the jig into the narrow spaces between a support structure and the reflection type light modulation devices. In this case, the attachment members can be fixed to the adjustment members by bonding the engaging projections and the engaging receivers after position adjustment of the reflection type light modulation devices.

It is preferable that the optical device further includes a plurality of optical elements which receive lights separated according to polarization using the plural reflection type polarization plates. Each of the attachment members includes a hollow member which has three openings communicating with the inside space, and the three openings of each of the attachment members are closed by the corresponding reflection type light modulation device, reflection type polarization plate, and optical element.

According to this structure, the three openings formed on each of the attachment members are closed by the reflection type light modulation device, the reflection type polarization plate, and the optical element such that the interior space of the attachment member is closed. In this case, the reflection surface of the reflection type light modulation device is disposed within the closed space. Thus, it is possible to prevent adhesion of dust to the reflection surface, and therefore deterioration of the projection images caused by shadow or the like on the projection images produced by dust adhering to the reflection surface.

It is preferable that each of the adjustment members has a main body attached to the corresponding light entrance surface of the color combining device, and that a clearance is formed between the optical element and the main body.

Since the spaces are formed between the optical elements attached to the attachment members and the main bodies attached to the adjustment members, cooling air enters the spaces when cooling air is supplied to the attachment members. When the transmission type polarization plates having relatively low heat resistance as optical elements are disposed on surfaces of the attachment members opposed to the adjustment members, for example, the optical elements can be cooled by the cooling air. Thus, deterioration of the optical elements caused by heat can be prevented.

In case of a structure which includes the engaging projections on the adjustment members and engaging receivers on the attachment members, it is preferable that each of the adjustment members has a main body attached to the corresponding light entrance surface of the color combining device and a pair of arms projecting from the main body to the upstream side of the optical path to pinch the corresponding attachment member. The engaging projections are formed on each pair of arms in such a manner as to project toward the opposite arms. The engaging receivers are concaved at the positions corresponding to the engaging projections on first and second side walls of each of the attachment members opposed to the arms.

According to a related-art structure including pins as engaging projections and holes as engaging receivers into which the pins are inserted with spaces therebetween, the positions of the reflection type light modulation devices are adjusted by shifting the attachment members in the extending directions of the pins. In this case, the pins need to be sufficiently large for supporting the attachment members which are heavy due to attachment of the reflection type light modulation devices and the first polarization plates to the attachment members, and the holes also need to be large-sized accordingly. Thus, the optical device having this structure becomes large.

According to the preferable structure of the first aspect of the invention, however, the positions of the reflection type light modulation devices are adjusted by shifting the attachment members along the engaging receivers with the engaging projections located within the engaging receivers, and the attachment members are held by a pair of the arms. Since the attachment members are supported by the arms smaller than the pins, size reduction of the optical device can be achieved.

It is preferable that an insertion groove connecting with the corresponding engaging receiver and extending toward a third side wall orthogonal to the first and second side walls is formed on each of the first and second side walls of each of the attachment members, and that each of the engaging projections is positioned within the corresponding engaging receiver via the insertion groove by inserting the attachment member into the space between the pair of the arms.

According to this structure, each insertion groove connecting with the engaging receiver is formed, and the engaging projection is positioned within the engaging receiver via the insertion groove by inserting the attachment member into the space between the pair of the arms. Thus, each engaging projection can be more easily positioned within the engaging receiver compared with the structure which locates the engaging projection within the engaging receiver by opening the pair of the arms.

It is preferable that the engaging receivers extend in a first direction orthogonal to the light entrance surfaces, and that the insertion grooves extend while inclined to a second direction orthogonal to the first direction.

According to this structure, the insertion grooves are inclined to the second direction, separation of the engaging projections from the engaging receivers via the insertion grooves is prevented when the attachment members and the adjustment members are shifted in the second direction at the time of alignment of the reflection type light modulation devices.

A projector according to a second aspect of the invention includes: a light source device; the optical device described above; a projection lens disposed opposed to the light exit surface to expand and project the image light; and a support structure which has a lens support portion for supporting the projection lens and combines the projection lens and the color combining device into one piece body by using the lens support portion.

According to this structure, the projection lens is combined with the color combining device via the lens support portion. Thus, the positions of the reflection type light modulation devices can be adjusted while check over the projection image expanded and projected via the projection lens combined with the color combining device is being made. Accordingly, position adjustment of the projector can be accurately performed.

BRIEF DESCRIPTION OF THE DRAWINGS

The invention will be described with reference to the accompanying drawings, wherein like numbers reference like elements.

DESCRIPTION OF EXEMPLARY EMBODIMENT

Figure 1:
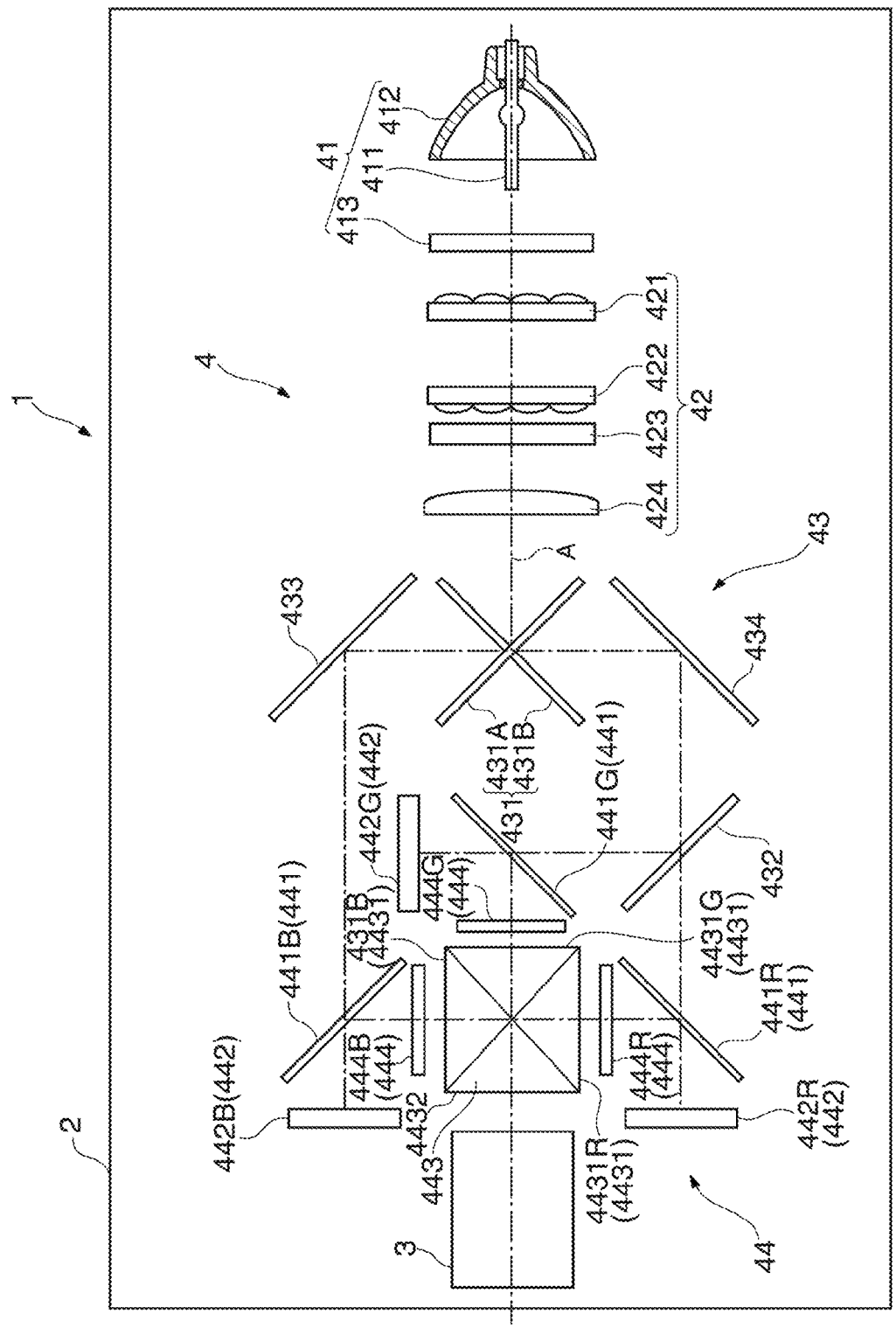
FIG. 1 schematically illustrates a structure of a projector according to an embodiment.

An exemplary embodiment according to the invention is hereinafter described with reference to the drawing.

Structure of Projector

FIG. 1 schematically illustrates a structure of a projector 1.

The projector 1 forms color images (image light) by modulating lights emitted from a light source according to image information, and expands and projects the color images on a screen (not shown). The projector 1 includes a case 2, a projection lens 3 as a projection device, and an optical unit 4 as illustrated in FIG. 1.

Though not specifically shown in FIG. 1, a cooling unit having cooling fan and the like for cooling respective components within the projector 1, a power supply unit for supplying power to the respective components within the projector 1, a control device for controlling the respective components within the projector 1, and others are disposed in the space inside the case 2 other than the areas of the projection lens 3 and the optical unit 4.

The case 2 positions and fixes respective devices 41 through 44 (described later) of the optical unit 4 relative to an illumination optical axis A (central axis of lights emitted from the light source device 41 to be described later) established inside the case 2.

The projection lens 3 is constituted by a combination of plural lenses, and expands and projects color images formed by the optical unit 4 on the screen.

The optical unit 4 is a unit for optically processing lights emitted from the light source to form color images corresponding to image signals under the control of the control device. As illustrated in FIG. 1, the optical unit 4 includes the light source device 41, the illumination device 42, the color separation device 43, the optical device 44, and other components.

The light source device 41 includes a light source lamp 411, a reflector 412, a UV (ultraviolet)-IR (infra red) filter 413, and other components as illustrated in FIG. 1. The directions of lights emitted from the light source lamp 411 are equalized by the reflector 412 such that the lights can travel toward the illumination device 42 via the UV-IR filter 413. The UV-IR filter 413 is a component for absorbing or reflecting lights in ultraviolet range and infrared range, and transmitting other lights.

The illumination device 42 includes a first lens array 421, a second lens array 422, a polarization conversion element 423, and a superimposing lens 424 as illustrated in FIG. 1. Lights emitted from the light source device 41 are divided into plural partial lights by the first lens array 421, and form an image in the vicinity of the second lens array 422. The respective partial lights released from the second lens array 422 enter the polarization conversion element 423 such that the center axis (chief ray) of the partial lights extends perpendicular to the entrance surface of the polarization conversion element 423, where the partial lights are converted into substantially one type of linear polarized lights by the polarization conversion element 423 before release. Then, the plural partial lights converted into linear polarized lights and released from the polarization conversion element 423 are superimposed on three reflection type liquid crystal panels 4421 (described later) of the optical device 44 by the superimposing lens 424.

As illustrated in FIG. 1, the color separation device 43 includes a cross dichroic minor 431 having B light reflection dichroic minor 431A for reflecting blue light, and a GR light reflection dichroic minor 431B for reflecting green light and red light, which minors 431A and 431B are disposed in X shape, a G light reflection dichroic mirror 432 for reflecting green light, and two reflection mirrors 433 and 434. The color separation device 43 separates the plural partial lights released from the illumination device 42 into three color lights of red, green, and blue.

More specifically, the plural partial lights released from the illumination device 42 enter the cross dichroic mirror 431. In the cross dichroic mirror 431, blue light component is reflected by the B light reflection dichroic mirror 431A, and green light component and red light component are reflected by the GR light reflection dichroic mirror 431B such that the blue light component, green light component, and red light component can be separated.

The blue light separated by the cross dichroic mirror 431 is reflected by the reflection mirror 433, and enters a wire grid 441B (described later) constituting the optical device 44.

The green light and red light separated by the cross dichroic mirror 431 are reflected by the reflection mirror 434, and enter the G light reflection dichroic mirror 432. The green light of the green and red lights having entered the G light reflection dichroic mirror 432 is reflected by the G light reflection dichroic mirror 432, and enters a wire grid 441G (described later) constituting the optical device 44. The red light passes through the G light reflection dichroic mirror 432 and enters a wire grid 441R (described later) constituting the optical device 44.

The optical device 44 is a unit for forming image light (color image) by modulating received lights according to image information. As illustrated in FIG. 1, the optical device 44 includes three wire grids 441 (red light wire grid 441R, green light wire grid 441G, and blue light wire grid 441B) as reflection type polarization plates, three reflection type light modulation devices 442 (reflection type light modulation devices for respective colors 442R, 442G, and 442B similarly to the wire grids 441), a cross dichroic prism 443 as color combining device, and three polarization plates 444 (polarization plates for respective colors 444R, 444G, and 444B) as optical elements.

The optical device 44 includes a head body (support structure) 445, attachment members 446, and adjustment members 447 which will be described later as well as the three wire grids 441 the three reflection type light modulation devices 442, the cross dichroic prism 443, and the three polarization plates 444. The details of the structure will be described later.

The three wire grids 441 separates received lights according to polarization through diffraction based on grid structure. As illustrated in FIG. 1, the respective wire grids 441 are inclined at approximately 45 degrees to the optical axis of the received lights. The respective wire grids 441 transmit polarized lights having substantially the same direction as the polarization direction equalized by the polarization conversion element 423, and reflect polarized lights having polarization direction perpendicular to the polarization direction equalized by the polarization conversion element 423 to separate the received lights according to polarization.

Each of the reflection type light modulation devices 442 includes a reflection type liquid crystal panel 4421 (see FIG. 4), and a support frame 4422 (see FIG. 4) for supporting the reflection type liquid crystal panel 4421, and is disposed substantially perpendicular to the optical axis of lights transmitted through the respective wire grids 441 as illustrated in FIG. 1. The reflection type liquid crystal panels 4421 are constituted by so-called LCOS (liquid crystal on silicon) containing liquid crystals on a silicone substrate. The reflection type liquid crystal panels 4421 control the orientation directions of the liquid crystals according to drive signals transmitted from the control device to modulate the polarization directions of the polarized lights transmitted through the wire grids 441 and reflect the modulated lights toward the wire grids 441. Only polarized lights which have been contained in the lights modulated by the reflection type liquid crystal panels 4421 and reflected toward the wire girds 441 and have polarization direction perpendicular to the polarization direction equalized by the polarization conversion element 423 are reflected by the wire grids 441.

Each of the polarization plates 444 is disposed opposed to the corresponding light entrance surface 4431 of the cross dichroic prism 443, and transmits linear polarized light having the same direction as the polarization direction of the lights reflected by the respective wire grids 441. By using both the wire grids 441 and the polarization plates 444, polarization component other than desired linear polarized light can be eliminated by the polarization plates 444 even when light having polarization component other than desired linear polarized light is reflected by the wired grids 441.

As illustrated in FIG. 1, the cross dichroic prism 443 includes light entrance surfaces 4431 for receiving respective color lights reflected by the respective wire grids 441 (light entrance surfaces for respective colors 4431R, 4431G, and 4431B), and a light exit surface 4432. The cross dichroic prism 443 combines received respective color lights into a color image, and releases the combined color image from the light exit surface 4432. The cross dichroic prism 443 has a substantially square shape in the plan view produced by affixing four rectangular prisms, and includes two dielectric multilayer films on the boundaries between the rectangular prisms. These dielectric multilayer films transmit green light reflected by the wire grid 441G and reflect red and blue lights reflected by the wire grids 441R and 441B. The respective color lights are thus combined and formed into a color image. The color image formed by the cross dichroic prism 443 is released through the light exit surface 4432, and expanded and projected onto the screen by the projection lens 3.

Detailed Structure of Optical Device

Figure 2:
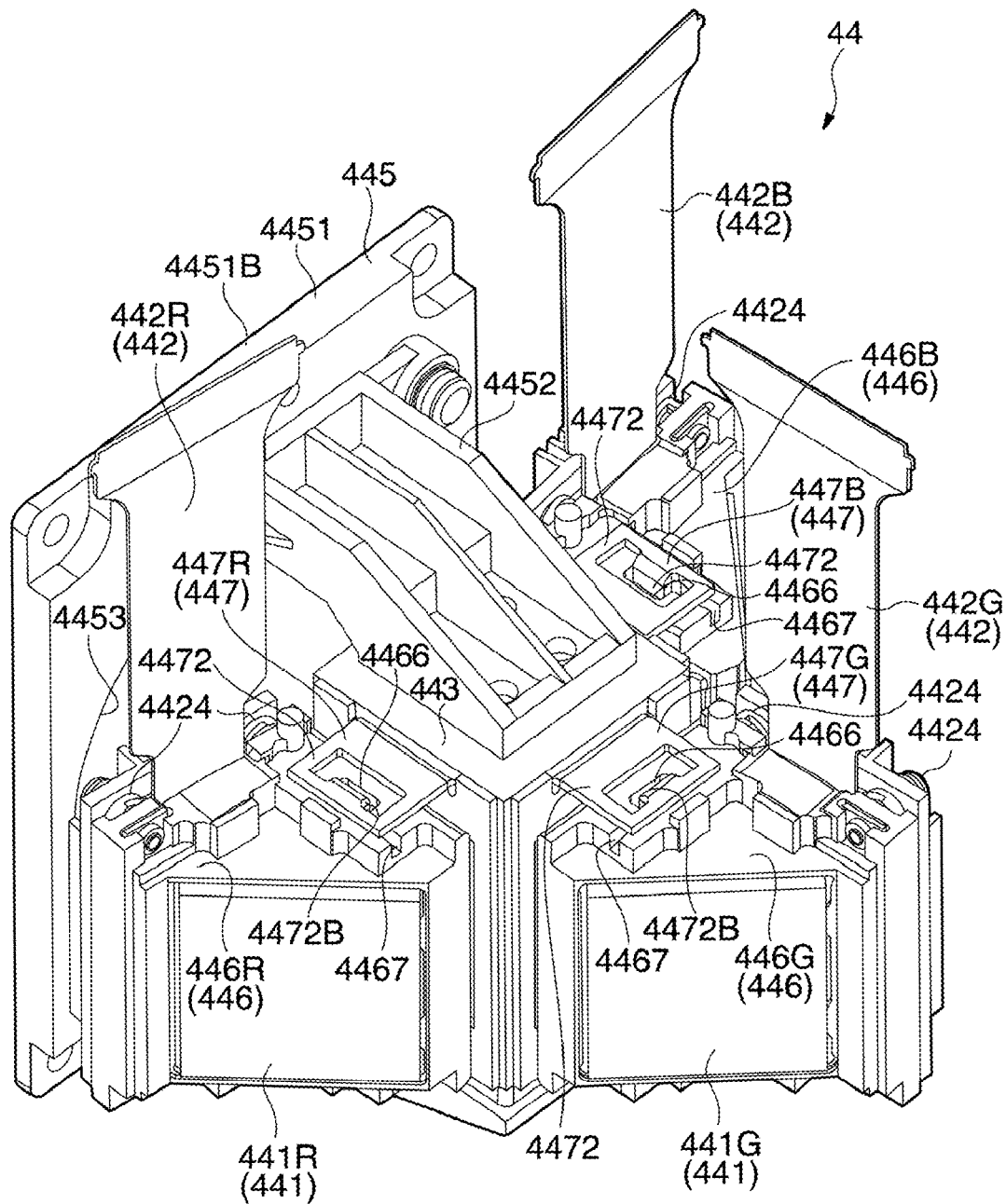
FIG. 2 is a perspective view of an optical device according to the embodiment as viewed from above.
Figure 3:
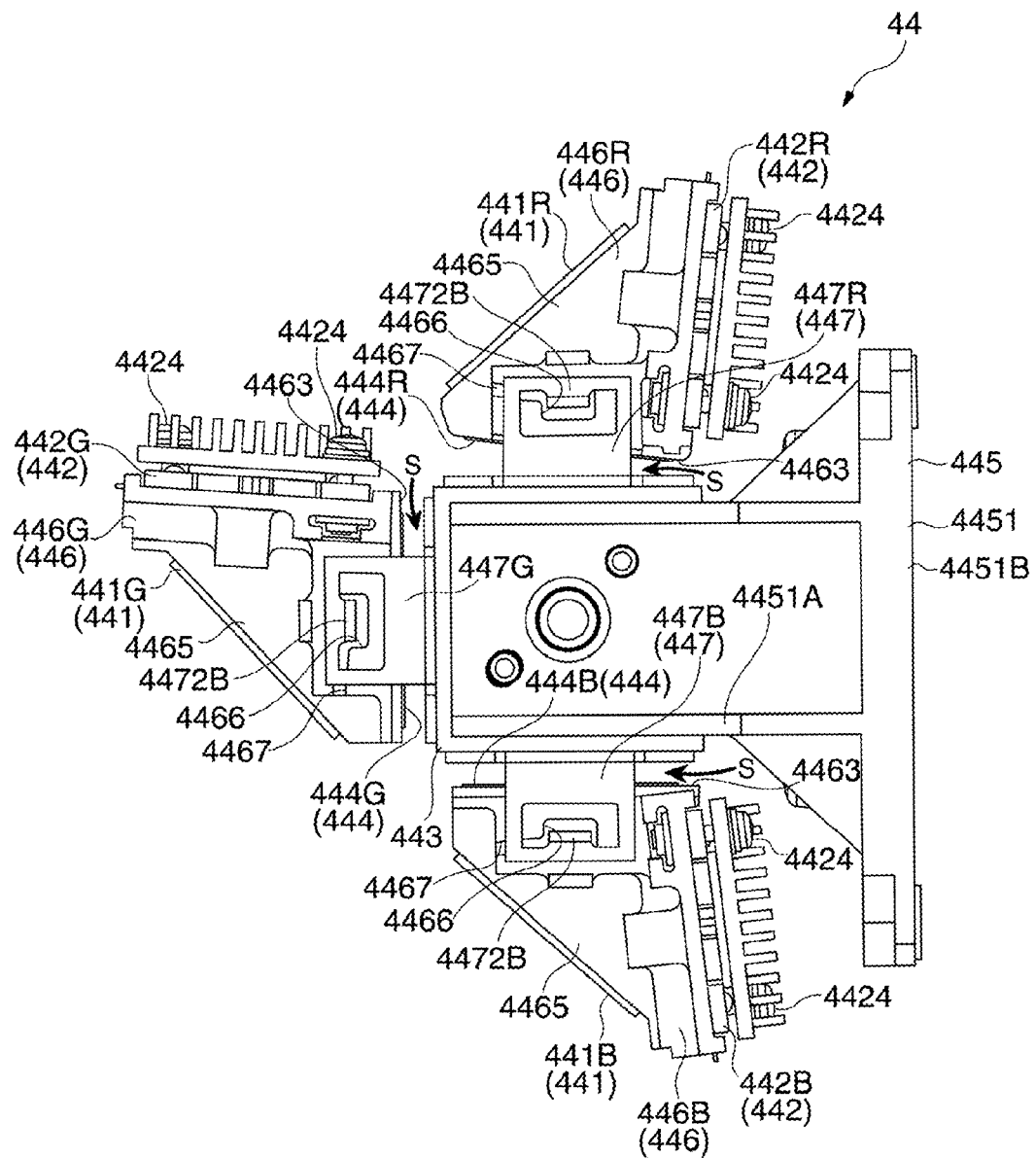
FIG. 3 illustrates the optical device according to the embodiment as viewed from below.

FIG. 2 is a perspective view of the optical device 44 as viewed from above, and FIG. 3 illustrates the optical device 44 as viewed from below.

The optical device 44 includes the head body 445 as support structure, the three attachment members 446 (attachment members for respective colors 446R, 446G, and 446B), and the three adjustment members 447 (adjustment members for respective colors 447R, 447G, and 447B) as well as the three wire grids 441, the three reflection type light modulation devices 442, the cross dichroic prism 443, and the three polarization plates 444 as illustrated in FIGS. 2 and 3.

The head body 445 has a head main body 4451 and a connection body 4452. The head main body 4451 has L shape in the side view, and is fixed to the case 2. The head main body 4451 has a pedestal portion 4451A on which the cross dichroic prism 443 is mounted to be fixed thereto (FIG. 3), and a lens support portion 4451B having a hole 4453 into which the projection lens 3 is inserted to support the projection lens 3. One end of the connection body 4452 is connected with the ceiling surface of the cross dichroic prism 443, and the other end is connected with the lens support portion 4451B of the head main body 4451. By fixing the head body 445 to the case 2, the respective optical components 441 through 444 and the projection lens 3 are positioned relative to the illumination optical axis A established within the case 2.

Figure 4:
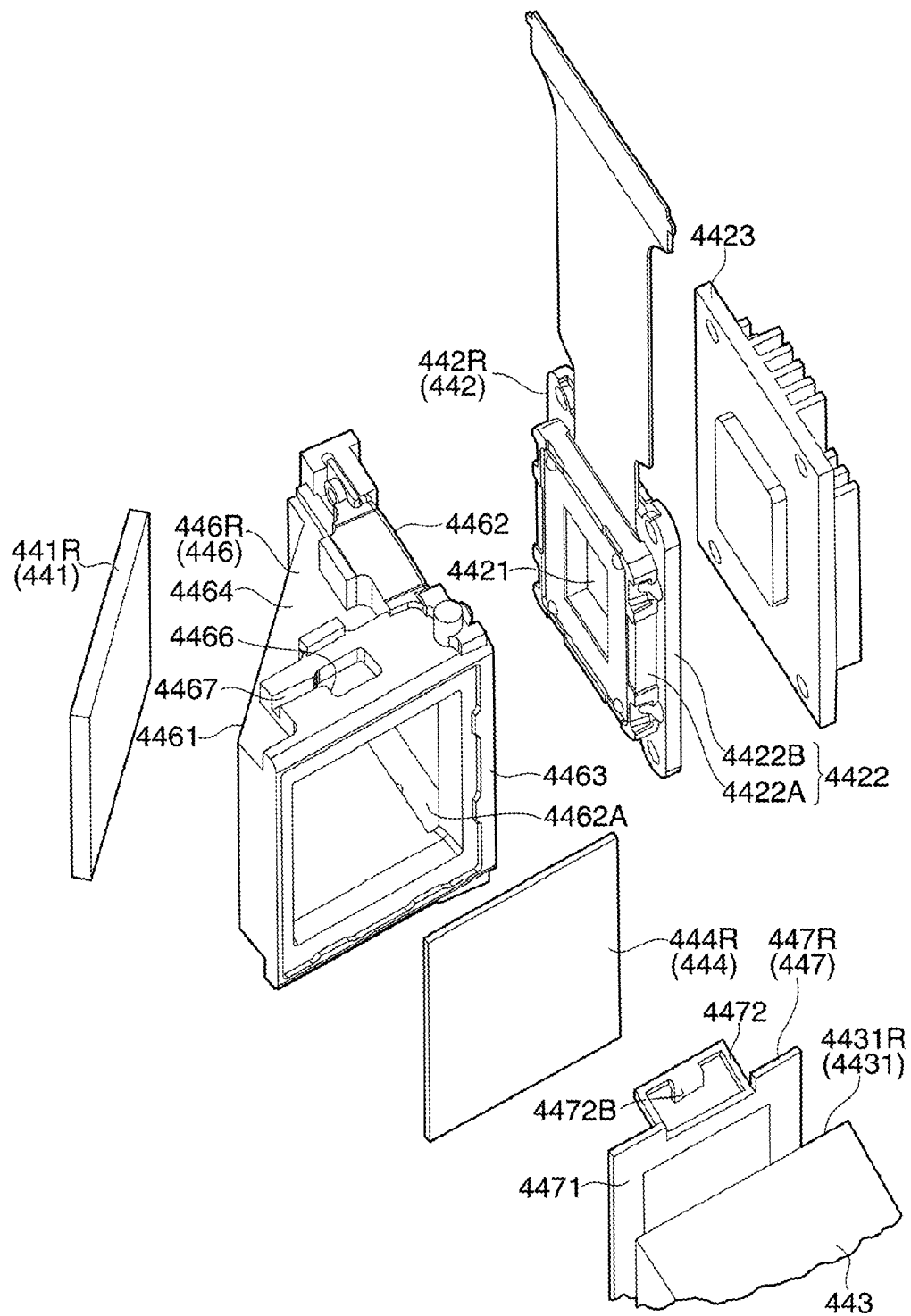
FIG. 4 is a perspective view showing disassembled attachment member and parts attached to the attachment member according to the embodiment.

FIG. 4 is a perspective view illustrating the disassembled attachment member 446 and respective components 441, 442, and 444 attached to the attachment member 446. The three attachment members 446 have the same shape, and the respective components 441, 442, and 444 have the same attachment structure to be attached to the attachment member 446. Thus, FIG. 4 shows only one attachment member 446 (446R) and the components 441R, 442R, and 444R to be attached to the attachment member 446R as an example.

A support frame 4422 of the reflection type light modulation device 442 has an insertion portion 4422A having a frame shape to be inserted into an opening portion 4462A, and a frame portion 4422B disposed on the back side of the insertion portion 4422A. A reflection surface of the reflection type liquid crystal panel 4421 is provided inside the insertion portion 4422A. The reflection type light modulation device 442 has a heat sink 4423 attached to the back of the support frame 4422 to release heat generated from the reflection type liquid crystal panel 4421 and the support frame 4422 as well as the reflection type liquid crystal panel 4421 and the support frame 4422.

Each of the attachment members 446 is made of plastic material as a component for supporting the wire grid 441, the reflection type light modulation device 442 and the polarization plate 444 and fixing the respective components 441, 442, and 444 to the corresponding light entrance surface 4431 of the cross dichroic prism 443. Cooling air is supplied from the cooling unit positioned below to the attachment member 446. This cooling air cools the respective components 441, 442, and 444 attached to the attachment member 446.

The attachment member 446 is a hollow component having a triangle pole shape, and has a first side face 4461 as slope face, a second side face 4462 as one of two faces 4462 and 4463 forming the vertical angle, and the third side face 4463 as the other face of the two faces 4462 and 4463 forming the vertical angle and disposed opposed to the adjustment member 447. Each of the side faces 4461 through 4463 has an opening.

The wire grid 441 is fixed to the first side face 4461 by adhesive or the like. The reflection type light modulation device 442 is fixed to the second side face 4462 by a screw 4424 (FIG. 2). In this case, the insertion portion 4422A of the reflection type light modulation device 442 is inserted into the opening portion 4462A formed on the second side face 4462. The polarization plate 444 is fixed to the third side face 4463 by adhesive or the like.

Each of a ceiling face 4464 and a bottom face 4465 (FIG. 3) of the attachment member 446 having this structure has a concave engaging groove 4466 as engagement receiver and a concave insertion groove 4467.

The engaging groove 4466 extends in a first direction (center axis of lights entering light entrance surface 4431) perpendicular to the light entrance surface 4431 of the cross dichroic prism 443.

The insertion groove 4467 extends in a second direction perpendicular to the first direction, and is connected with the engaging groove 4466. The insertion groove 4467 is slightly inclined from the engaging groove 4466 toward the outer end in the direction away from the light entrance surface 4431.

Figure 5:
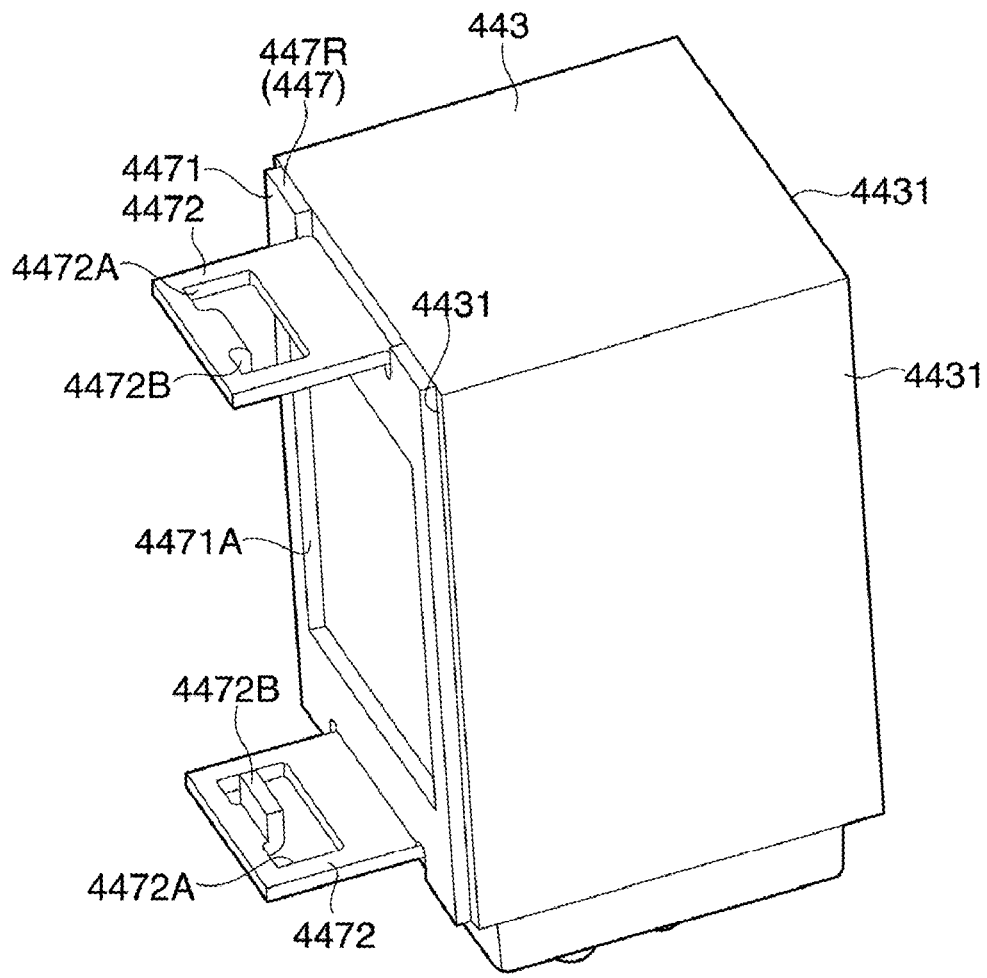
FIG. 5 is a perspective view of a adjustment member attached to a cross dichroic prism according to the embodiment.

FIG. 5 is a perspective view illustrating the adjustment member 447 attached to the cross dichroic prism 443. The adjustment member 447 is attached to each of the light entrance surfaces 4431 of the cross dichroic prism 443. Since the three adjustment members 447 have the same shape, only the adjustment member 447R is shown in FIG. 5 as an example similarly to the case of FIG. 4.

The adjustment member 447 is attached to the light entrance surface 4431 of the cross dichroic prism 443 by bonding to position the attachment member 446 relative to the cross dichroic prism 443 and further to position the reflection type light modulation device 442 attached to the attachment member 446 relative to the cross dichroic prism 443. The details of this structure will be described later.

The adjustment member 447 is produced by sheeting metal plate, and has a main body 4471 and arms 4472.

The main body 4471 is a rectangular component attached to the light entrance surface 4431 of the cross dichroic prism 443 by ultraviolet hardening type adhesive. The main body 4471 has an opening 4471A for supplying lights having passed through the polarization plate 444 to the cross dichroic prism 443.

The arms 4472 are a pair of components extending from the upper portion and lower portion of the main body 4471 toward the attachment member 446. An opening 4472A and an engaging claw 4472B as an engaging projection projecting to the other arm 4472 are provided at each of the ends of the two arms 4472. The engaging claws 4472B are produced by folding tongue pieces provided at the ends of the arms 4472 as parts forming the openings 4472A toward the opposite arms 4472. The pair of the engaging claws 4472B are inserted with spaces from the corresponding engaging grooves 4466 in the first direction to pinch the attachment member 446.

According to this structure which inserts the attachment member 446 between the pair of the arms 4472 with the engaging claws 4472B aligned with the insertion grooves 4467, the engaging claws 4472B are positioned within the engaging grooves 4466 via the insertion grooves 4467, and thus the attachment member 446 can be attached to the adjustment member 447.

The optical device 44 having this structure is manufactured in the following manner.

Initially, the projection lens 3 and the cross dichroic prism 443 are fixed to the head body 445 to combine these components into one piece body. Also, the wire grids 441, the reflection type light modulation devices 442, and the polarization plates 444 are fixed by the attachment members 446. Then, the adjustment members 447 coated with ultraviolet hardening type adhesive and the attachment members 446 attached to the adjustment members 447 are installed on the cross dichroic prism 443 while the jig is holding the attachment members 446. The attachment members 446 held by the jig can be disposed in such a position as not to interfere with the head body 445. Then, adjustment of focus and alignment are performed by using the jig.

For focus adjustment for positioning the reflection type light modulation devices 442 at the back focus position of the projection lens 3, inspection lights are initially released from the jig toward the wire grids 441, and then the attachment members 446 are shifted along the center axis of the lights entering the light entrance surfaces 4431 of the cross dichroic prism 443 (along engaging grooves 4466) by using the jig while check over the projection image expanded and projected via the projection lens 3 is being made. Then, the attachment members 446 are disposed such that the reflection type light modulation devices 442 can be located at the back focus position of the projection lens 3. According to this embodiment, conditions such as the lengths of the arms 4472 and the positions of the engaging grooves 4466 are determined such that clearances S (see FIG. 3) can be formed between the attachment members 446 and the adjustment members 447.

For alignment adjustment for aligning pixels of the reflection type light modulation devices 442, inspection lights are initially released from the jig toward the wire grids 441, and the adjustment members 447 to which the attachment members 446 have been attached are shifted in two directions orthogonal to the center axis of the lights entering the light entrance surfaces 4431 of the cross dichroic prism 443 (such as horizontal direction and vertical direction) by using the jig while check over the projection image expanded and projected via the projection lens 3 is being made. Since the insertion grooves 4467 are slightly inclined from the engaging grooves 4466 toward the outer ends in the directions away from the light entrance surfaces 4431 as discussed above, the attachment members 446 are not separated from the adjustment members 447 even when the attachment members 446 and the adjustment members 447 are shifted. After the adjustment members 447 are disposed at such positions that pixels on the projection images are not shifted from those on the projection images of the other reflection type light modulation devices 442, ultraviolet beams are applied to the adhesive for hardening. As a result, the bonding between the engaging grooves 4466 and the engaging claws 4472B and between the main bodies 4471 and the light entrance surfaces 4431 is achieved, and thus the attachment members 446 and the adjustment members 447 are fixed to the cross dichroic prism 443. The optical device 44 is now completed through fixation of the three attachment members 446 and adjustment members 447 to the cross dichroic prism 443.

ADVANTAGES OF EMBODIMENT

The following advantages are provided by the projector 1 according to this embodiment.

The adjustment members 447 have the engaging claws 4472B, and the attachment members 446 have the engaging grooves 4466 into which the engaging claws 4472B are inserted with spaces between the engaging grooves 4466 and the engaging claws 4472B. The positions of the reflection type light modulation devices 442 are thus adjusted by moving the attachment members 446. In this case, the jig is installed on the sufficiently wide area around the attachment members 446 and the cross dichroic prism 443 to make position adjustment of the reflection type light modulation devices 442. Thus, the positions of the reflection type light modulation devices 442 can be more easily adjusted compared with a related-art structure which requires insertion of the jig into the narrow spaces between the head body 445 and the reflection type light modulation devices 442. According to this embodiment, the attachment members 446 can be fixed to the light exit surface by bonding the engaging grooves 4466 and the engaging claws 4472B after position adjustment of the reflection type light modulation devices 442.

According to this embodiment, the projection lens 3 is combined with the cross dichroic prism 443 via the lens support portion 4451B. Thus, the positions of the reflection type light modulation devices 442 can be adjusted while check over the projection image expanded and projected via the projection lens 3 is being made. Accordingly, position adjustment of the projector can be more accurately performed.

The three openings formed on each of the attachment members 446 are closed by the reflection type light modulation device 442, the wire grid 441, and the polarization plate 444 such that the interior space of the attachment member 446 is closed. The reflection surface of the reflection type light modulation device 442 is disposed within the closed space. Thus, it is possible to prevent adhesion of dust to the reflection surface, and therefore deterioration of the projection images caused by shadow or the like on the projection images produced by dust adhering to the reflection surface.

Since the spaces S are formed between the attachment members 446 and the adjustment members 447, cooling air is supplied into the spaces S from the cooling unit. In this case, the transmission type polarization plates 444 disposed on the third side faces 4463 of the attachment members 446 opposed to the adjustment members 447 and having relatively low heat resistance can be cooled by the cooling air. Thus, deterioration of the polarization plates 444 caused by heat can be prevented.

In case of a structure including pins as engaging projections on the adjustment members 447 and holes as engaging receivers into which the pins are inserted with spaces therebetween, the positions of the reflection type light modulation devices are adjusted by shifting the attachment members in the extending directions of the pins. In this case, the pins need to be sufficiently large for supporting the attachment members which are heavy due to attachment of the reflection type light modulation devices and the reflection type polarization plates to the attachment members, and the holes also need to be large-sized accordingly. Thus, the optical device having this structure becomes large.

According to this embodiment, however, the positions of the reflection type light modulation devices 442 are adjusted by shifting the attachment members 446 along the engaging grooves 4466 with the engaging claws 4472B located within the engaging grooves 4466, and the attachment members 446 are held by a pair of the arms 4472. Since the attachment members 446 are supported by the arms smaller than the pins, size reduction of the optical device can be achieved.

The insertion grooves 4467 connecting with the engaging grooves 4466 are formed, and the engaging claws 4472B are positioned within the engaging grooves 4466 via the insertion grooves 4467 by inserting the attachment members 446 into the spaces between the corresponding pairs of the arms 4472. Thus, the engaging claws 4472B can be more easily positioned within the engaging grooves 4466 compared with the structure which locates the engaging claws 4472B within the engaging grooves 4466 by opening the pairs of the arms 4472.

Since the insertion grooves 4467 are inclined to the second direction, separation of the engaging claws 4472B from the engaging grooves 4466 via the insertion grooves 4467 is prevented when the attachment members 446 and the adjustment members 447 are shifted in the second direction at the time of alignment of the reflection type light modulation devices 442.

MODIFICATION OF EMBODIMENT

The invention is not limited to the embodiment described and depicted herein, and it is therefore intended that modifications and improvements within the scope of the invention are included in the appended claims.

While the polarization plates 444 are provided as optical elements in this embodiment, other optical elements such as retardation plates and optical compensation plates may be employed to close the interior spaces of the attachment members 446.

While the light source device 41 is constituted by a discharge light emission type light source device in this embodiment, other various types of solid light emission elements such as laser diode, LED (light emitting diode), organic EL (electro luminescence) element, and silicon light emission element may be used as the light source device 41.

According to this embodiment, only one light source device 41 is equipped, and light from the light source device 41 is separated into three color lights by the color separation device 43. It is possible, however, to eliminate the color separation device 43 and use three solid light emission elements discussed above for emitting three color lights.

While the projector 1 is a three-plate-type projector having three reflection type light modulation devices 442, the projector 1 may be a projector which includes two reflection type light modulation devices 442 or four or more reflection type light modulation devices 442. In this case, each number of the wire grids 441 and the attachment members 446 is equivalent to the number of the reflection type light modulation devices 442.

While the example of the front-type projector which projects images in the screen viewing direction has been discussed in this embodiment, the invention is applicable to a rear-type projector which projects in the direction opposite to the screen viewing direction.

The optical device according to the invention capable of easily adjusting the positions of the reflection type light modulation devices is appropriate for an optical device included in a projector used for the purpose of presentation, home theater or the like.

What is claimed is:

1. An optical device, comprising:
a plurality of reflection type light modulation devices which modulate received lights as entrance lights according to image information and release the modulated lights as emission lights;
a plurality of reflection type polarization plates which separate the entrance lights entering the reflection type light modulation devices and the emission lights modulated by the reflection type light modulation devices according to polarization;
a plurality of attachment members which support the reflection type light modulation devices and the reflection type polarization plates;
a color combining device which has a plurality of light entrance surfaces through which lights separated by the plural reflection type polarization plates according to polarization enter and a light exit surface, combines the received respective lights into image light, and releases the image light through the light exit surface;
a plurality of adjustment members which support the plural attachment members and are fixed to the light entrance surfaces of the color combining device;
engaging projections provided on either the attachment members or the adjustment members and projecting toward the others of the attachment members and the adjustment members; and
engaging receivers provided on the others of the attachment members and the adjustment members such that the engaging projections are inserted into the engaging receivers with clearances between the engaging receivers and the engaging projections.

2. The optical device according to claim 1, further comprising:
a plurality of optical elements which receive lights separated according to polarization using the plural reflection type polarization plates,
wherein
each of the attachment members includes a hollow member which has three openings communicating with the inside space, and
the three openings of each of the attachment members are closed by the corresponding reflection type light modulation device, reflection type polarization plate, and optical element.

3. The optical device according to claim 2, wherein:
each of the adjustment members has a main body attached to the corresponding light entrance surface of the color combining device; and
a clearance is formed between the optical element and the main body.

4. The optical device according to claim 1, wherein:

in case of a structure which includes the engaging projections on the adjustment members and engaging receivers on the attachment members, each of the adjustment members has a main body attached to the corresponding light entrance surface of the color combining device and a pair of arms projecting from the main body to the upstream side of the optical path to pinch the corresponding attachment member;

the engaging projections are formed on each pair of arms in such a manner as to project toward the opposite arms; and the engaging receivers are concaved at the positions corresponding to the engaging projections on first and second side walls of each of the attachment members opposed to the arms.

5. The optical device according to claim 4, wherein:

an insertion groove connecting with the corresponding engaging receiver and extending toward a third side wall orthogonal to the first and second side walls is formed on each of the first and second side walls of each of the attachment members; and each of the engaging projections is positioned within the corresponding engaging receiver via the insertion groove by inserting the attachment member into the space between the pair of the arms.

6. The optical device according to claim 5, wherein:

the engaging receivers extend in a first direction orthogonal to the light entrance surfaces; and the insertion grooves extend while inclined to a second direction orthogonal to the first direction.

7. A projector, comprising:

a light source device;

the optical device according to claim 1;

a projection lens disposed opposed to the light exit surface to expand and project the image light; and a support structure which has a lens support portion for supporting the projection lens and combines the projection lens and the color combining device into one piece body by using the lens support portion.

* * * * *